(12) United States Patent
Davis

(10) Patent No.: US 7,574,766 B1
(45) Date of Patent: Aug. 18, 2009

(54) POULTRY HOUSE FLOOR AND WALL CLEANER

(76) Inventor: Kevin Davis, 235 County Road 1108, Goshen, AL (US) 36035

( * ) Notice: Subject to any disclaimer, the term of this patent is extended or adjusted under 35 U.S.C. 154(b) by 669 days.

(21) Appl. No.: 11/201,498

(22) Filed: Aug. 11, 2005

(51) Int. Cl.
*B08B 1/00* (2006.01)
*A01K 1/01* (2006.01)
*A01K 31/04* (2006.01)

(52) U.S. Cl. .................. 15/93.1; 30/170; 37/266; 37/268; 37/270; 37/279; 119/442; 119/447; 119/451; 172/656; 172/684.5; 172/781; 172/792

(58) Field of Classification Search .................. 15/93.1, 15/93.3, 93.4; 30/170; 37/266, 268, 270, 37/273, 279; 119/442, 447, 451; 172/684.5, 172/781, 792, 656
See application file for complete search history.

(56) References Cited

U.S. PATENT DOCUMENTS

| | | | |
|---|---|---|---|
| 63,771 A * | 4/1867 | White | 172/663 |
| 777,604 A * | 12/1904 | Cowles | 172/322 |
| 2,652,642 A * | 9/1953 | Gifford et al. | 172/438 |
| 3,160,141 A | 12/1964 | Crutchfield | |
| 3,409,120 A | 11/1968 | Van Huis | |
| 3,662,420 A | 5/1972 | Jordan, Jr. | |
| 3,845,516 A | 11/1974 | Abbott et al. | |
| 4,619,412 A | 10/1986 | Willingham | |
| 4,854,507 A | 8/1989 | Smith | |
| 5,607,046 A | 3/1997 | Krehl et al. | |
| 5,740,763 A | 4/1998 | Hollingsworth | |
| 5,749,114 A | 5/1998 | Miller, Jr. et al. | |
| 6,000,647 A | 12/1999 | Hardy | |
| 6,446,298 B1 | 9/2002 | Berg, Jr. et al. | |

* cited by examiner

*Primary Examiner*—Mark Spisich
(74) *Attorney, Agent, or Firm*—C. Brandon Browning; Maynard, Cooper & Gale, PC

(57) ABSTRACT

An apparatus for moving debris such as chicken manure away from a wall including a frame assembly movable across a floor, a scraping member suspended from the frame assembly and a guide member connected to the scraping member. The scraping member is arranged for scraping debris away from the wall and causing movement of the scraping member and frame assembly toward the wall when the frame assembly is moved in a predetermined direction across the floor. The guide member causes movement of the scraping member away from the wall and around objects projecting out from the wall such as support beams.

19 Claims, 5 Drawing Sheets

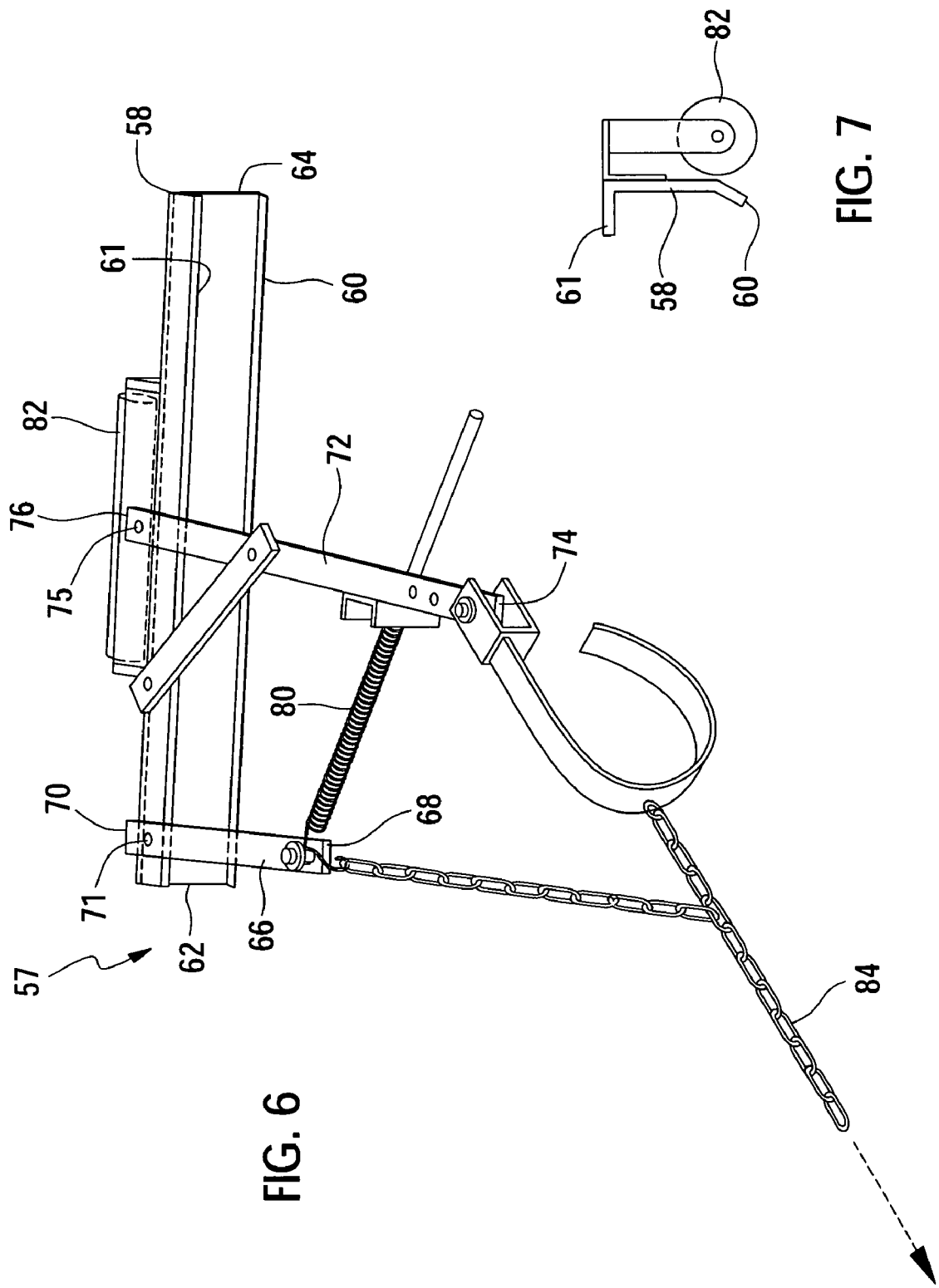

POULTRY HOUSE FLOOR AND WALL CLEANER

FIELD OF THE INVENTION

This invention relates to a floor and wall cleaner and more particularly to a poultry house floor and wall cleaner for moving debris away from the wall of a poultry house.

BACKGROUND OF THE INVENTION

Commercial poultry houses may have concrete floors, but such floors have become prohibitively expensive and therefore, at the present time, most poultry houses have dirt floors. In either case, over a period of time, the chicken manure forms a layer of litter on the poultry house floor which must not be allowed to build up indefinitely.

Certain prior art machines typified by U.S. Pat. Nos. 3,263,257, 3,845,516, and 3,662,420 address the problem of removing poultry litter from the floors of large commercial poultry houses. The prior art machines are concerned only with the removal of litter and, in some instances, do a less than adequate job. As a consequence, considerable amounts of litter remain on the poultry house floor, and this is undesirable. Specifically, for example, the prior art machines fail to effectively remove litter that builds up on and about the walls of poultry houses, especially where the walls are irregularly shaped or supported by exposed, interior vertical support posts. That is because the prior art is machines are not effectively directed around such support posts.

OBJECTS AND SUMMARY OF THE INVENTION

A primary object of the invention is to provide a poultry house floor and wall cleaner.

A further primary object of the invention is to provide a poultry house floor and wall cleaner that effectively moves debris off of and away from a wall of the poultry house.

A further primary object of the invention is to provide a poultry house floor and wall cleaner that can be pulled by a tractor, all-terrain vehicle or the like.

A further primary object of the invention is to provide a poultry house floor and wall cleaner that excludes electrically or hydraulically powered components.

A further object of the invention is to provide a method of moving debris off of and away from a wall.

Another object of the invention is to provide a wall cleaner that can effectively clean irregularly shaped walls, for example, those that include exposed vertical support posts or other objects projecting out from about the walls.

The objects of the invention are accomplished by providing an apparatus including a frame that can be pushed or pulled across a floor, a scraper pivotally supported by the frame at an angle relative to the movement of the frame to cause movement of the blade toward a wall to be cleaned and a guide member pivotally connected to an end of the scraper at one end of the guide member and biased against the frame at the other end of the guide member, the guide member being provided for directing movement of the scraper rearward and away from a wall when the guide member contacts an exposed post or the like. A bias element, such as a spring, a hydraulic piston, a rubber band or the like, can be connected to and between the frame and the scraper for forcing the scraper forward to its original position relative to the frame after the scraper is moved rearward by action of the guide member contacting the post.

To support the scraper from the frame, one or more connecting arms are connected to and between the scraper and the frame. Preferably, the connecting arms are pivotally connected to both the scraper and frame so that the scraper can more easily pivot rearward and away from a wall when actuated by the interaction of the guide member and a post and forward and toward the wall when actuated by the bias member. Further, the connecting arms can be somewhat flexible to allow the flexing upward and downward of the arms thereby allowing the scraper to float across the floor and to be easily raised from contact with the floor when the apparatus is to be stored or transported.

BRIEF DESCRIPTION OF THE DRAWINGS

FIG. 6 is a front perspective view of a poultry house floor and wall cleaner in accordance with a second preferred embodiment of the present invention.

FIG. 7 is a cross-sectional view of a scraper and roller assembly of the cleaner of FIG. 6.

DETAILED DESCRIPTION OF PRESENTLY PREFERRED EMBODIMENTS

Figure 1:
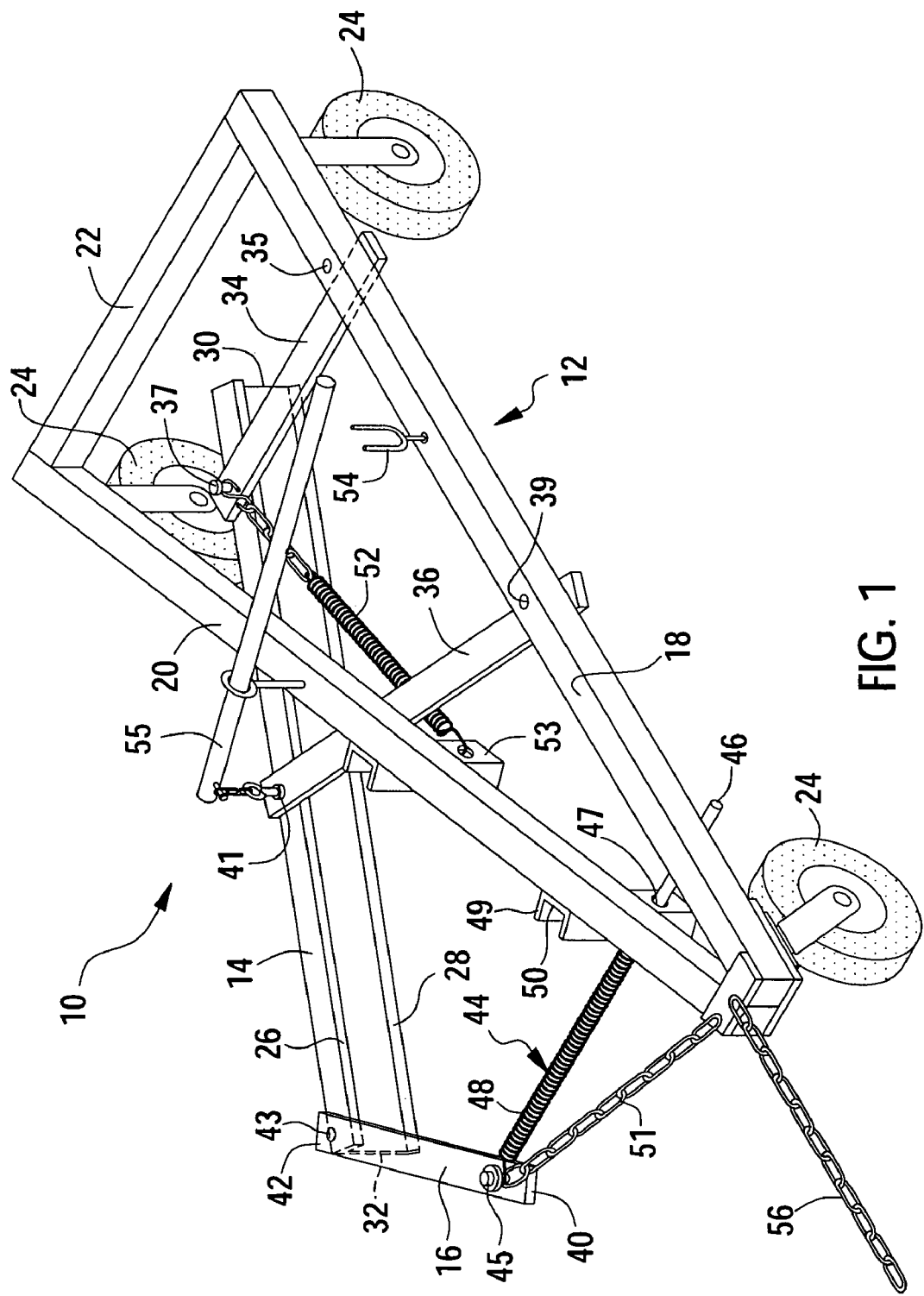
FIG. 1 is a front perspective view of a poultry house floor and wall cleaner in accordance with a first preferred embodiment of the present invention.
Figure 2:
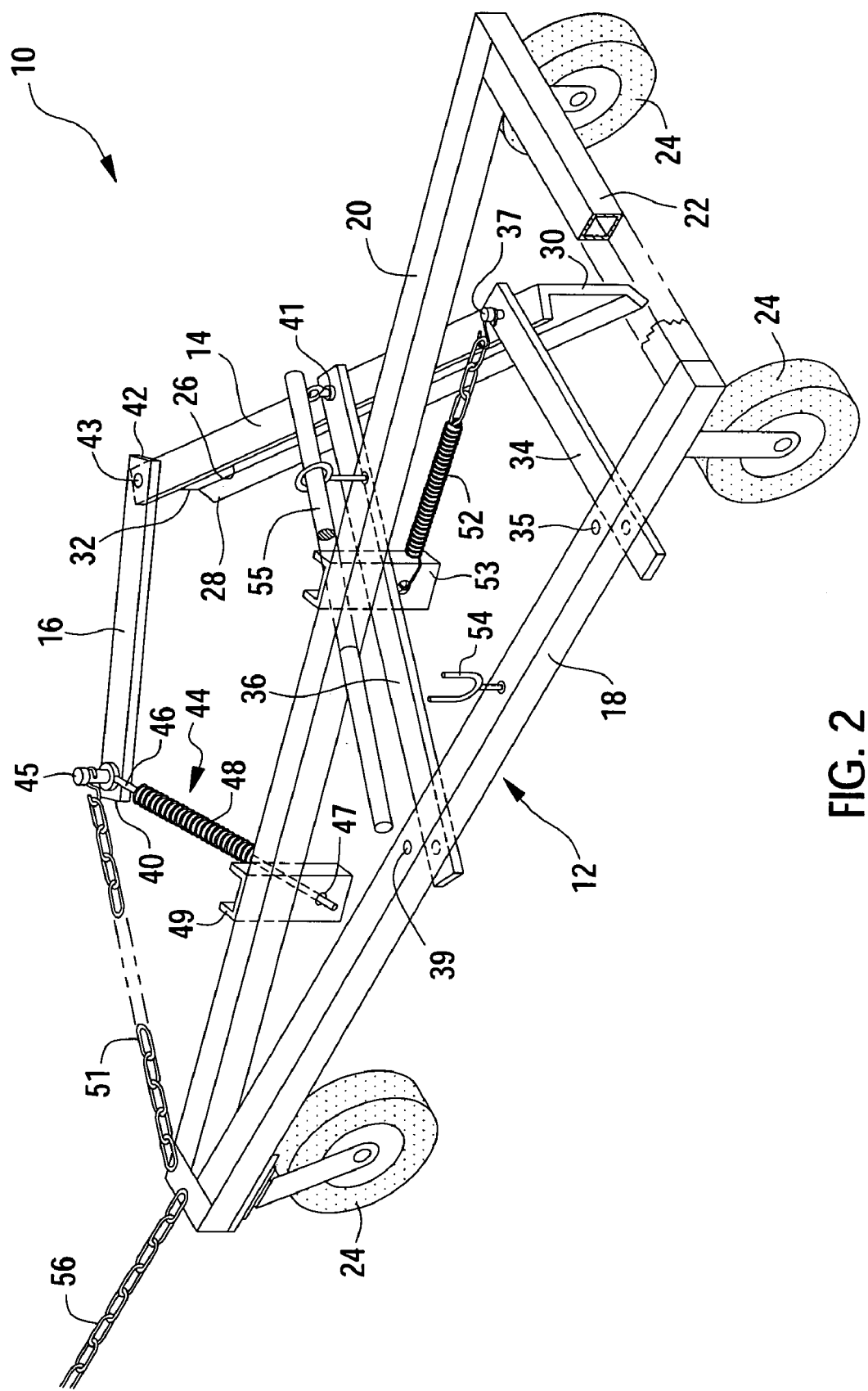
FIG. 2 is a rear perspective view of the cleaner of FIG. 1.
Figure 3:
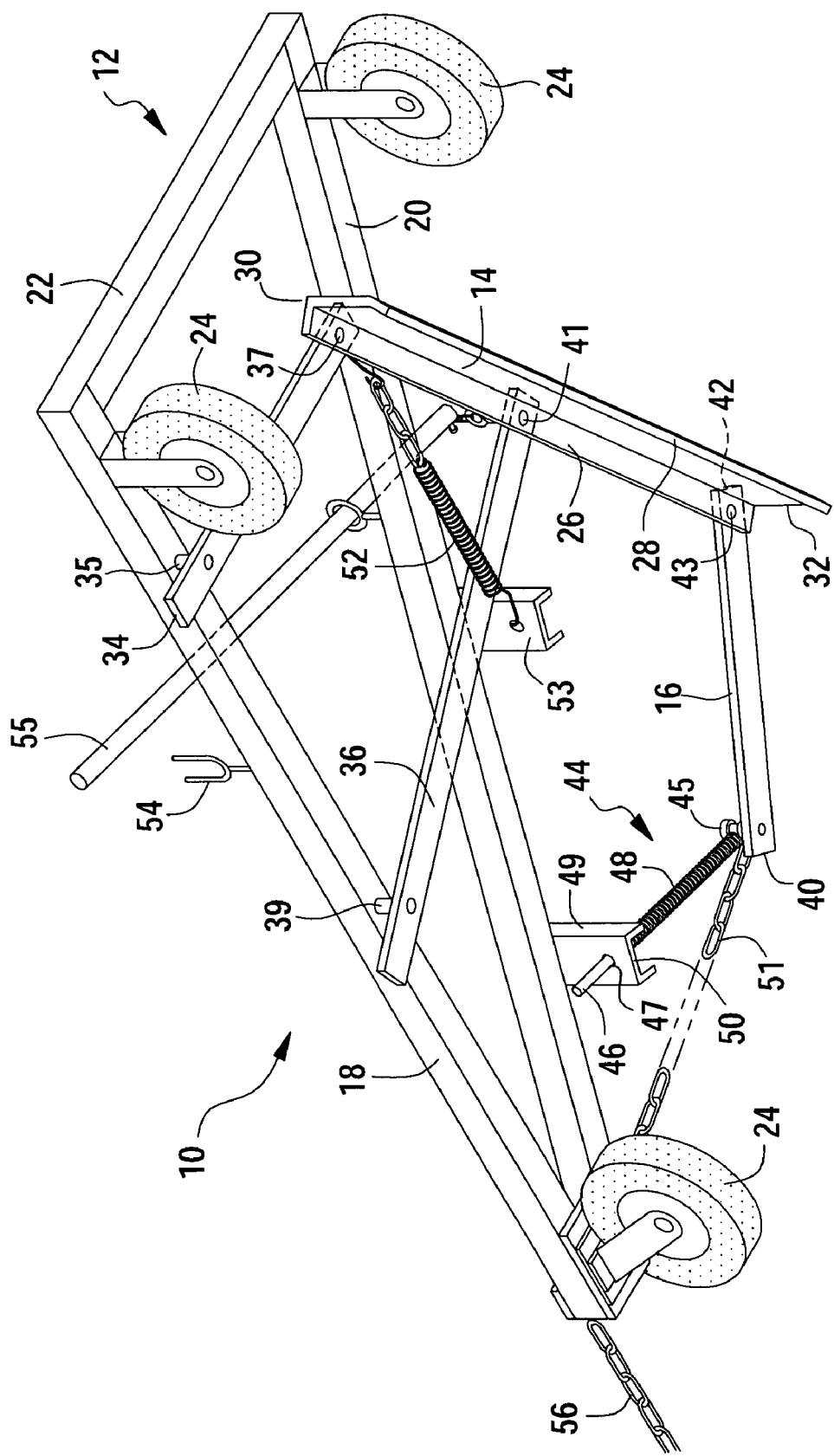
FIG. 3 is a bottom perspective view of the cleaner of FIG. 1.
Figure 4:
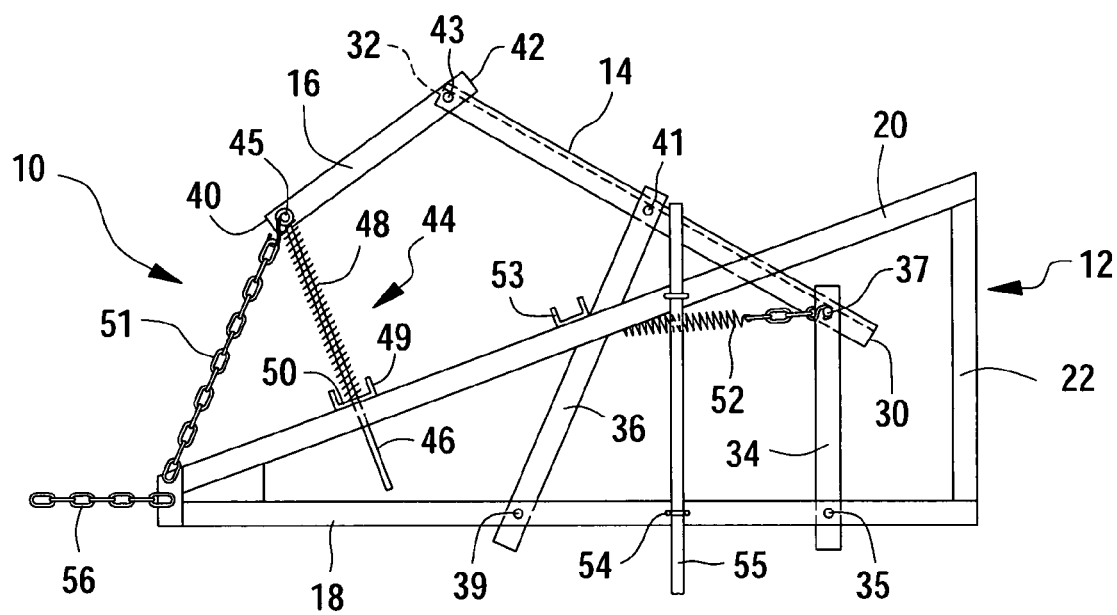
FIG. 4 is top plan view of the cleaner of FIG. 1.
Figure 5:
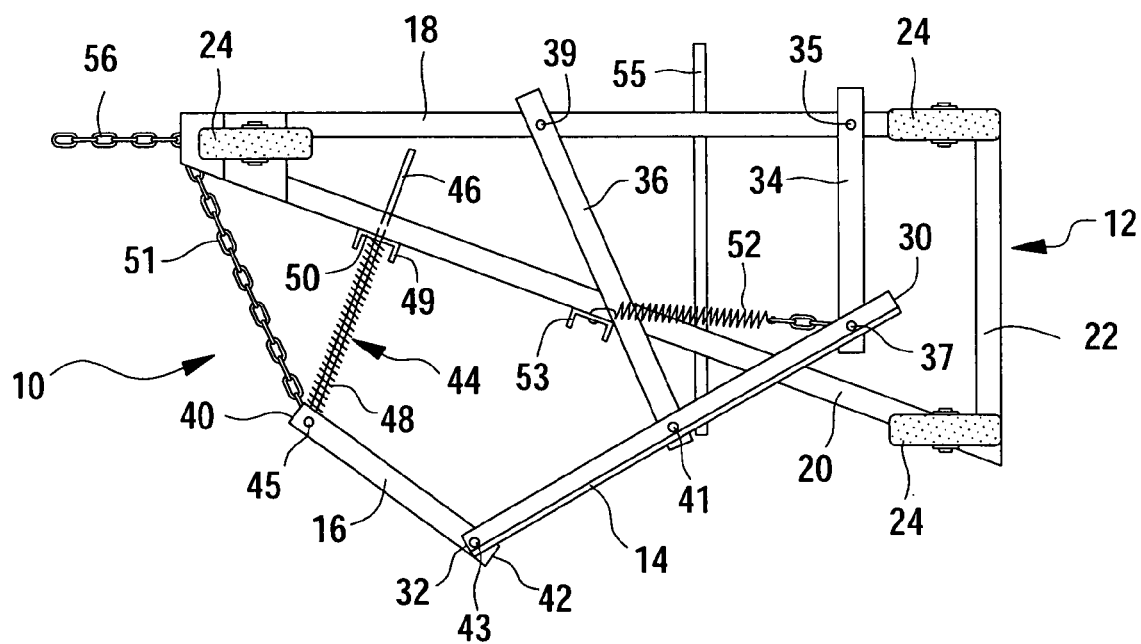
FIG. 5 is a bottom plan view of the cleaner of FIG. 1.

The preferred embodiment of the present invention is illustrated in FIGS. 1 through 5, where like portions share like numbering. FIGS. 6 and 7 illustrates an alternative to the preferred embodiment.

Generally, as illustrated at FIGS. 1 through 5, a poultry house floor and wall cleaner 10 in accordance with the preferred embodiment of the present invention includes a frame 12 that can be moved across a floor, a scraping blade 14 supported by and underneath frame 12 and a guide arm 16 connected to and between frame 12 and blade 14 for efficiently directing movement of blade 14 along a wall to be cleaned. In use, cleaner 10 is located beside a wall with blade 14 oriented at a predetermined angle relative to the wall. Frame 12 is then moved alongside the wall, and the resulting interaction of blade 14 with the floor results in the movement of blade 14 toward and against the wall. To steer blade 14 away from the wall when, for example, a post is in the path of blade 14, guide arm 16 is arranged to contact the post and pivot blade 14 away from and around the post. The interaction of blade 14 with the floor and the movement of frame 12 alongside the wall, in part, cause the quick return of blade 14 against the wall.

More specifically, frame 12 is composed of three metallic beams each having a rectangular cross-section. The beams include a left beam 18, a right beam 20 and a rear beam 22, all fixed to one another about the respective ends thereof by welding to form a triangular platform capable of supporting blade 14 underneath frame 12 when blade 14 is moved across a floor. While frame 12 preferably comprises three beams arranged to form a triangular platform, it is anticipated that frame 12 can include more or less beams. Thus, for example, rear beam 22 can be absent, or beams 18, 20 and 22 can be replaced by a solid, single, integral base. So that frame 12 can be moved across a floor, a conventional wheel assembly 24 is attached by welding to the underside of frame 12 about each of the intersections of beams 18, 20 and 22. Each wheel assembly 24 can swivel so that lateral movement of frame 12 can occur.

Supported underneath frame 12 is blade 14. Blade 14 is composed of an elongate, substantially rectangular metal plate. Blade 14 has an upper edge 26 that is bent about 45 degrees forward along the length of blade 14 for preventing debris from moving over upper edge 26 and a lower edge 28 that is bent about 30 degrees forward along as length of blade 14 for effectively scraping debris off of a floor. Blade 14 also includes a left lateral edge 30 and a right lateral edge 32 for scraping debris from a wall. A pair of flat, flexible metal arms pivotally connect blade 14 with frame 12 in a floating-type arrangement. Thus, each of the arms allows vertical flexing of the arms while resisting horizontal flexing. This allows blade 14 to be suspended underneath frame 12 at a distance sufficient to contact 10 lower edge 28 with a floor across which frame 12 is moved. Thus, blade 14 can float across the floor and can be raised from the floor when it is desired to end contact between the floor and blade 14.

More particularly, a first arm 34, pivotally connected with left beam 18 by a bolt 35 near the intersection of left beam 18 and rear beam 22, extends out in the direction of right beam 20 to pivotally connect with upper edge 26 of blade 14 by a bolt 37 near left lateral edge 30 thereof. The connection of first arm 34 with blade 14 occurs beneath a foot print of frame 12. A second arm 36, slightly longer than first arm 34, and oriented substantially parallel to first arm 34 and pivotally connected with left beam 18 by a bolt 39 about the midpoint along the length of left beam 18, extends out in the direction of right beam 20 to 20 pivotally connect with upper edge 26 of blade 14 by a bolt 41 near the midpoint of the length of blade 14. Unlike the connection of first arm 34 with blade 14, the connection of second arm 36 with blade 14 occurs out from beneath the foot print of frame 12. That is due to the triangular shape at frame 12 and the length of second arm 36, which in combination with the length at first arm 34, holds blade 14 at a predetermined angle relative to frame 12.

Arms 34 and 36 connect with blade 14 at a predetermined angle relative to frame 12 to cause movement of blade 14 and frame 12 toward a wall to be cleaned when frame 12 is moved substantially parallel to the wall with lower edge 28 of blade 14 in contact with the floor. This interaction alone, that is, the combination of the movement of frame 12 substantially parallel to the wall and the contact between lower edge 28 of blade 14 with the floor, causes frame 12 and blade 14 to move toward the wall to be cleaned and to press right lateral edge 32 of blade 14 there against. This way, right lateral edge 32 of blade 14 is brought into and maintained in contact with the wall, and debris on the wall is removed from the wall by interaction of lateral edge 32 on the wall and directed away. Thus, no guided steering mechanism is required to control the lateral movement of frame 12 or to keep blade 14 pressing against the wall.

When cleaner 10 is moved parallel to a wall and an object such as a vertical wall post resides in the path of cleaner 10 between cleaner 10 and the wall to be cleaned, a mechanism is needed to effectively and efficiently direct blade 14 around the object while removing any debris located on or about the object itself. Otherwise, blade 14 can catch or get hooked on the object, debris can build up around the objects and damage can occur to frame 12 and blade 14. To prevent these things from happening, guide arm 16 is provided. Guide arm 16 is a substantially flat, elongate metal piece having a leading end 40 and a back end 42. Back end 42 of guide arm 16 connects with blade 14 by a bolt 43 about right lateral edge 32 thereof to form a substantially L-shaped piece with guide arm 16 being arranged adjacent to right beam 20 in order to initiate contact with any object that may project out from a wall to be cleaned or that is otherwise located between frame 12 and the wall.

To cushion the strike against guide arm 16 and frame 12 when guide arm 16 contacts such an object, leading end 40 of guide arm 16 is biased against frame 12. Thus, a first bias element 44 is connected to and between guide arm 16 and frame 12. First bias element 44 can include a spring assembly, a hydraulic piston, a rubber band or otherwise any device known in the art that can force leading end 40 away from frame 12. As illustrated at FIGS. 1 through 5, first bias element 44 preferably is a spring assembly that includes a rod 46 connected to guide arm 16 at leading end 40 by a bolt 45. Rod 46 extends from leading end 40 of guide arm 16 through a hole 47 in a substantially U-shaped first stop 49 welded to right beam 20. A spring 48 is positioned around guide rod 46 which presses against leading end 40 of guide arm 16 and a side 50 of first stop 49. Thus, when guide arm 16 contacts an object, guide arm 16 is pivoted about its intersection with blade 14 at bolt 43 toward frame 12, and rod 46 is pressed a distance through hole 47 in stop 49. Once guide arm 16 is moved beyond the object, the pressure exerted by spring 48 presses guide arm 16 away from frame 12 back into its original position. A chain 51 is provided for maintaining leading end 40 of guide arm 16 at a predetermined distance from right beam 20 and at a predetermined angle relative to blade 14. Chain 51 extends to and between leading end 40 of guide arm 16 and frame 12 at the intersection of right left beam 18 and right beam 20.

To further prevent damage to cleaner 10 when blade 12 contacts an object other than the wall, blade 14 is directly biased against frame 12. Thus, a second bias element 52 is provided. As illustrated in FIGS. 1 through 5, second bias element 52 is connected to blade 14 about its connection with first arm 34 at bolt 37 and to a second stop 53 welded to right beam 20. Second bias element 52 can include a spring, a hydraulic piston, a rubber band or otherwise any device known in the art that can exert force on blade 14 affecting movement of blade 14 and first connecting arm 34 toward second stop 53. Preferably, second bias element 52 is a spring. When frame 12 is moved across a floor, the interaction of blade 14 with the floor causes blade 14 to pivot rearward at bolts 35, 37 39 and 41. When guide arm 16 contacts an object, such as a post, blade 14 is caused to pivot farther rearward thus increasing the tension in second bias element 52. As a result, when guide arm 16 moves across and ultimately beyond the object, blade 14 is pivoted forward at bolts 35, 37, 39 and 41 by second bias element 52 which acts to force blade 14 forward into its original position. This way, right lateral edge 32 of blade 14 can be directed away from the wall to be cleaned by the action of guide arm 16 while maintaining contact of blade arm 14 with the wall near the point where right lateral edge 32 of blade 14 would otherwise contact the object by the action of second bias element 52. As guide arm 16 passes over the object, second bias element 52 continually pulls blade 14 forward thereby maintaining right lateral edge 32 against the wall and object. Thus, the pressure exerted by second bias element 52, first bias element 44 and the pivoting of guide arm 16 act to guide blade 14 around and across the object. In other words, it allows blade 14 to ride along the wall and the object in a floating arrangement.

In order to transport cleaner 10 from one place to another without blade 14 being in contact with the floor, a handle 55 is provided. Handle 55 has a length that extends from beyond left beam 18, across right beam 20 to blade 14, where it is attached to upper edge 26 of blade 14. By pivoting handle 55 downward toward left beam 18, blade 14 is lifted upward and away from the floor. A locking means 54 is connected on the top side of left beam 18 for receiving handle 55 in a selectively fixed manner.

In use, cleaner 10 is connected with a motor vehicle such as a tractor, all terrain vehicle or the like by a pull chain 56 that connects with frame 12 about the intersection of left beam 18 and right beam 20. Handle 55 is pivoted downward and locked against left beam 18 with locking means 54 thereby disengaging blade 14 from a surface on which frame 12 rests. Cleaner 10 can then be transported across the surface to a poultry house where the walls and floor thereof need cleaning. Once there, cleaner 10 is arranged adjacent to a wall to be cleaned with rear beam 22 being positioned substantially perpendicular to the wall. Handle 55 is then disengaged from locking means 54 allowing blade 14 to drop into contact with the floor. Thereafter, cleaner 10 is pulled by the motor vehicle in a predetermined direction running essentially parallel to the wall. The pressure exerted on blade 14 causes blade 14 to pivot slightly rearward at bolts 35, 37, 39 and 41 thereby generating tension on second bias element 52.

Given the angle at which blade 14 is suspended underneath frame 12 and the direction frame 12 is moved, the interaction of blade 14 with the floor causes blade 14 and frame 12 to move toward the wall so that right lateral edge 32 of blade 14 is caused to press against the wall where it scrapes debris from the wall. Simultaneously, the debris removed from the wall and the debris located on the floor in the area of the wall are directed across blade 14 and away from the wall. The angle formed by upper edge 26 of blade 14 helps to contain the debris on blade 14 as the debris moves across it. Thus, debris is prevented from rising over upper edge 26. The angle formed by lower edge 28 also helps to contain debris on blade 14 and in addition force debris upward from the floor.

When cleaner 10 encounters objects projecting outward from the wall, for example, vertical wall post or supports, the arrangement of guide arm 16 in front of blade 14 allows guide arm 16 to initiate contact with the object rather than right lateral edge 32 of blade 14. When this happens, the forward movement of cleaner 10 in combination with the interaction of guide arm 16 with the object causes guide arm 16 to pivot toward frame 12 about its intersection with blade 14 at bolt 43 thereby depressing first bias element 44. The action of pivoting guide arm 16 inward toward frame 12 and depressing first bias element 44 cushions the blow of guide arm 16 against the object. Further, the pivoting of guide arm 16 toward frame 12 allows guide arm 16 to more easily glide across the object which, in turn, allows right lateral edge 32 of blade 14 to remain in contact with the wall right up until lateral edge 32 would otherwise contact the backside of the object. Edge 32 is then steered away from the backside of the object when the tension in first bias element 44 is great enough to prevent any further pivoting of guide arm 16 toward beam 20. This way, most of the debris located about the intersection of the object and the wall can be removed. Contact between the object and guide arm 16 also increases the tension in second bias element 52 since blade 14 is forced a distance rearward toward rear beam 22. Thus, an increase in force is exerted on blade 14 in the direction of second stop 53 by second bias element 52.

When cleaner 10 is moved beyond the object, the tension incurred by first bias element 44 and second bias element 52 is quickly released forcing leading end 40 of guide arm 16 away from frame 12 and forcing blade 14 and first connecting arm 34 toward second stop 53. The interaction of blade 14 with the floor then directs blade 14 and frame 12 toward the wall so that debris lying on the floor and found on the wall directly on the other side of the object can be removed.

An alternative poultry house floor and wall cleaner 57 is illustrated in FIGS. 6 and 7. Poultry house wall cleaner 57 includes an elongate metal scraper 58 having a lower edge 60 for scraping a surface, an upper edge 61, a left lateral edge 62 and a right lateral edge 64. An elongate metal guide member 66 similar to guide arm 16 described above is provided having a front end 68 and a back end 70, back end 70 being pivotally connected with scraper 58 about right lateral edge 64 of scraper 58 by a bolt 71. Cleaner 57 further includes an elongate metal frame piece 72 having a forward end 74 and a rearward end 76, rearward end 76 being connected with scraper 78 between left lateral edge 62 and right lateral edge 64 by a bolt 75. A single bias element 80, identical to first bias element 44 described above, is connected to and between front end 68 of guide member 66 and forward end 74 of frame 72. In addition, a roller assembly 82 is connected against the backside of scraper 58 for transporting cleaner 57 across a surface when it is desired to move scraper 58 across the surface with lower edge 60 disengaged from the surface.

In use, a pull chain 84 is connected with a motor vehicle and to cleaner 57 about front end 68 of guide member 66 and forward end 74 of frame 72. Cleaner 57 is then positioned adjacent to a wall to be cleaned and moved across the floor substantially parallel to the wall. The interaction of lower edge 60 of scraper 58 with the floor, causes movement of cleaner 57 toward the wall so that right lateral edge 64 is pressed against the wall. When cleaner 57 encounters an object such as a vertical wall support, guide member 66 is pressed toward frame 72 depressing bias element 80 and directing movement of scraper 58 around the object. Once cleaner 56 moves beyond the object, bias element 80 forces guide member 66 toward the wall, and the interaction of lower edge 60 of scraper 58 with the floor as cleaner 57 is moved essentially parallel to the wall causes movement of scraper 58 and cleaner 57 back toward the wall.

As will be apparent to one skilled in the art, various modifications can be made within the scope of the aforesaid description. Such modifications being within the ability of one skilled in the art form a part of the present invention and are embraced by the claims below.

The invention claimed is:

1. An apparatus for moving debris away from a wall comprising,
    a frame assembly adapted to be moved across a floor,
    a scraping member suspended from the frame assembly,
    a guide member connected to the scraping member and biased against the frame assembly, the guide member being adapted and arranged for affecting movement of the scraping member away from the wall, and
    a bias element connected to and between the frame assembly and the scraping member, and
    wherein the scraping member is arranged for scraping debris away from the wall and affecting movement of the scraping member toward the wall when the frame assembly is moved in a predetermined direction across the floor.

2. The apparatus according to claim 1 wherein the guide member is pivotally connected to an end of the scraping member that extends out from underneath the frame assembly.

3. The apparatus according to claim 1 wherein an end of the guide member opposite the scraping member is biased against the frame assembly.

4. The apparatus according to claim 3 wherein the end of the guide member opposite the scraping member is connected with the frame assembly by a non-rigid retaining line.

5. The apparatus of claim 1 wherein the scraping member comprises a substantially rectangular blade.

6. The apparatus according to claim 5 wherein at least one of a top edge portion or a bottom edge portion of the rectangular blade forms an angle along a length of the rectangular blade.

7. The apparatus according to claim 6 wherein the angle ranges between 30 degrees and 45 degrees.

8. The apparatus according to claim 1 further comprising one or more connecting arms connected to and between the scraping member and the frame assembly.

9. The apparatus according to claim 8 wherein the one or more connecting arms are pivotally connected with at least one of the scraping member and the frame assembly.

10. The apparatus according to claim 1 wherein the bias element is connected to and between a rear portion of the scraping member and a middle portion of the frame assembly.

11. The apparatus according to claim 1 wherein the frame assembly includes a first frame strut and a second frame strut, the apparatus further comprising a connecting arm pivotally connected to the first frame strut at one end of the connecting arm and to the scraping member at another end of the connecting arm.

12. The apparatus according to claim 11 wherein the guide member is pivotally connected to an end of the scraping member that extends out from underneath the frame assembly, the guide member being provided for manipulating the scraping member around an object located about the wall.

13. The apparatus according to claim 12 wherein the frame assembly is substantially V-shaped.

14. A method of moving debris away from the wall comprising,
- providing the apparatus of claim 1,
- contacting the scraping member with the floor,
- moving the frame assembly substantially parallel to the wall,
- affecting movement of the scraping member and frame assembly toward the wall with the scraping member,
- scraping debris away from the wall with the scraping member,
- contacting the guide member with an object located adjacent to the wall, and
- affecting movement of the scraping member away from the wall with the guide member.

15. An apparatus for moving debris away from a wall comprising,
- a frame assembly adapted to be moved across a floor,
- a scraping member suspended from the frame assembly, and
- one or more connecting arms connected to and between the scraping member and the frame assembly, the one or more connecting arms being pivotally connected with at least one of the scraping member and the frame assembly,
- wherein the scraping member is arranged for scraping debris away from the wall and affecting movement of the scraping member toward the wall when the frame assembly is moved in a predetermined direction across the floor,
- wherein the one or more connecting arms includes a first connecting arm and a second connecting aim, the first connecting arm being connected to and between a rear portion of the scraping member and a rear portion of the frame assembly and the second connecting arm being connected to and between a middle portion of the scraping member and a middle portion of the frame assembly.

16. An apparatus for moving debris away from a wall comprising,
- a frame assembly adapted to be moved across a floor,
- a scraping member suspended from the frame assembly, and
- a guide member pivotally connected to an end of the scraping member that extends out from underneath the frame assembly, the guide member being provided for manipulating the scraping member around an object located about the wall,
- wherein the scraping member is arranged for scraping debris away from the wall and affecting movement of the scraping member toward the wall when the frame assembly is moved in a predetermined direction across the floor,
- wherein the frame assembly includes a first frame strut and a second frame strut, the apparatus further comprising a connecting arm pivotally connected to the first frame strut at one end of the connecting arm and to the scraping member at another end of the connecting arm, and
- wherein the guide member is biased against the second frame strut.

17. The apparatus according to claim 16 further comprising a first bias element connected to and between the second frame strut and an end of the guide member opposite the scraping member.

18. The apparatus according to claim 17 further comprising a second bias element connected to and between the scraping member and the second frame strut.

19. The apparatus according to claim 18 further comprising a non-rigid retaining line connected to and between the frame assembly and the end of the guide member opposite the scraping member.

* * * * *